United States Patent
Clayton et al.

(10) Patent No.: US 8,921,264 B2
(45) Date of Patent: Dec. 30, 2014

(54) THERMOCHROMIC COLORING PAD

(71) Applicant: Chromatic Technologies, Inc., Colorado Springs, CO (US)

(72) Inventors: Terrill Scott Clayton, Colorado Springs, CO (US); Timothy J. Owen, Colorado Springs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 30 days.

(21) Appl. No.: 13/752,056

(22) Filed: Jan. 28, 2013

(65) Prior Publication Data

US 2014/0213442 A1 Jul. 31, 2014

(51) Int. Cl.
| | | |
|---|---|---|
| *B41M 5/30* | (2006.01) | |
| *B41M 5/34* | (2006.01) | |
| *A63H 33/22* | (2006.01) | |
| *B43K 8/00* | (2006.01) | |
| *B41M 5/327* | (2006.01) | |
| *B41M 5/333* | (2006.01) | |
| *B41M 5/337* | (2006.01) | |

(52) U.S. Cl.
CPC ............... *B41M 5/305* (2013.01); *B41M 5/34* (2013.01); *A63H 33/22* (2013.01); *B43K 8/00* (2013.01); *B41M 5/327* (2013.01); *B41M 5/3275* (2013.01); *B41M 5/3335* (2013.01); *B41M 5/3375* (2013.01)
USPC .......................................... 503/201; 503/204

(58) Field of Classification Search
CPC ................................ B41M 5/305; B41M 5/34
USPC .................................................. 503/201, 204
See application file for complete search history.

(56) References Cited

U.S. PATENT DOCUMENTS

| | | |
|---|---|---|
| 4,720,301 A | 1/1988 | Kito et al. |
| 5,053,309 A | 10/1991 | Sanders et al. |
| 5,219,625 A | 6/1993 | Matsunami et al. |
| 5,441,418 A | 8/1995 | Brown et al. |
| 5,514,635 A | 5/1996 | Filo |
| 5,558,700 A | 9/1996 | Shibahashi et al. |
| 5,591,255 A | 1/1997 | Small |
| 5,721,059 A | 2/1998 | Kito et al. |
| 5,785,746 A | 7/1998 | Kito et al. |
| 5,786,838 A | 7/1998 | Steinhauser et al. |
| 5,805,245 A | 9/1998 | Davis et al. |
| 5,997,849 A | 12/1999 | Small et al. |
| 6,139,779 A | 10/2000 | Small et al. |
| 6,346,024 B1 | 2/2002 | Engel |
| 6,494,950 B1 | 12/2002 | Fujita et al. |
| 6,620,571 B2 | 9/2003 | Katampe et al. |
| 7,494,537 B2 | 2/2009 | Ono et al. |
| 2007/0116910 A1 | 5/2007 | Polykarpov et al. |

FOREIGN PATENT DOCUMENTS

| | | |
|---|---|---|
| CN | 202463433 | 10/2012 |
| EP | 0506452 A1 | 9/1992 |
| JP | S57203588 A | 12/1982 |

*Primary Examiner* — Bruce H Hess
(74) *Attorney, Agent, or Firm* — Lathrop & Gage LLP

(57) ABSTRACT

A children's coloring pad may incorporate thermochromic pigments that are specially formulated to develop color and clear color by respective applications of cold and hot temperatures. The pad may be used in a similar manner as with respect to finger painting, but without the residual mess.

11 Claims, 7 Drawing Sheets

THERMOCHROMIC COLORING PAD

BACKGROUND

Activities for children may include drawing by various means including crayons, water colors, or finger painting. While the children certainly enjoy these activities, this can necessitate the use of special precautions to prevent the children from making an undue mess. For example, the activities may be limited to a special area and frequently also close caregiver supervision is required.

Chemicals that change color over a range of temperatures are known as thermochromic systems. Thermochromic chemicals can be manufactured to have a color change that is reversible or irreversible. U.S. Pat. No. 5,591,255, entitled "Thermochromic Ink Formulations, Nail Lacquer and Methods of Use", issued Jan. 7, 1997 to Small et al., discloses methods of producing thermochromic coating formulations without ingredients known to be harmful to thermochromic inks. The use of distilled water as a fountain solution for off-set printing using thermochromic ink is also disclosed.

Thermochromic systems use colorants that are either liquid crystals or leuco dyes. Liquid crystals are used less frequently than leuco dyes because they are very difficult to work with and require highly specialized printing and handling techniques. Thermochromic pigments are a system of interacting parts. Leuco dyes act as colorants, while weak organic acids act as color developers. Solvents or waxes variably interact with the leuco dyes according to the temperature of the system. As is known in the art, thermochromic systems are microencapsulated in a protective coating to protect the contents from undesired effects from the environment. Each microcapsule is self-contained, having all of the components of the entire system that are required for the color change. The components of the system interact with one another differently at different temperatures. Generally, the system is ordered and colored below a temperature corresponding to the full color point. The system becomes increasingly unordered and starts to lose its color at a temperature corresponding to an activation temperature.

Below the activation temperature, the system is usually colored. Above the activation temperature the system is usually clear or lightly colored. The activation temperature corresponds to a range of temperatures at which the transition is taking place between the full color point and the clearing point. Generally, the activation temperature is the temperature at which the human eye can perceive that the system is starting to lose color, or alternatively, starting to gain color. Presently, thermochromic systems are designed to have activation temperatures over a broad range, from about −20° C. to about 80° C. or more. With heating, the system becomes increasingly unordered and continues to lose color until it reaches a level of disorder at a temperature corresponding to a clearing point. At the clearing point, the system lacks any recognizable color.

In this manner, thermochromic pigments change from a specific color to clear upon the application of thermal energy or heat in a thermally-driven cycle exhibiting well-known hysteresis behavior. Thermochromic pigments come in a variety of colors. When applied to a substrate, such as paper, the pigment exhibits the color of the dye at the core of the microcapsules. In one example, when heat is applied generally in the range of 30 to 32° C., the ink changes from the color of the pigment to clear. When the substrate is allowed to return to a temperature under approximately 30° C., the ink returns to the original color of the pigment.

U.S. Pat. No. 5,785,746, entitled "Preparation Method for Shear-Thinning Water-Based Ball-Point Pen Inks Compositions and Ball-Point Pens Employing the Same", issued Jul. 28, 1998 to Kito et al., discloses reversible thermochromic microcapsular pigment mixed in an ink composition. The microcapsules have concavities to moderate stress resulting from an external force during use in a ball-point pen.

U.S. Pat. No. 5,805,245, entitled "Multilayered Dispersed Thermochromic Liquid Crystal", issued Sep. 8, 1998 to Davis, discloses a thermochromic substance, applied to inert films in stacked layers with a non-invasive barrier between each thermochromic substance. The thermochromic substance in each layer responds in a different temperature range so that as the temperature changes, each layer repeats a similar sequence of colors. The substrate is a water-based acrylic copolymer formulation coated or permeated with a black pigment. A transparent inert film or non-invasive barrier serves as a protective coating for the thermochromic film and as a support for the next layer of the thermochromic substance.

Specific thermochromic coating formulations are known in the art. See, for example, U.S. Pat. Nos. 4,720,301, 5,219,625 5,558,700, 5,591,255, 5,997,849, 6,139,779, 6,494,950 and 7,494,537, all of which are expressly incorporated herein by reference. These thermochromic coatings are known to use various components in their formulations, and are generally reversible in their color change. Thermochromic; pigments for use in these coatings are commercially available in various colors, with various activation temperatures, clearing points and full color points. Thermochromic coatings may be printed by offset litho, dry offset, letterpress, gravure, flexo and screen processes, among other techniques.

SUMMARY

The presently disclosed instrumentalities overcome the problem outlined above and advance the art by providing a coloring pad that advantageously permits activities analogous to finger painting or coloring, but without the attendant mess. These advantages and others are achieved by incorporating thermochromic materials in the coloring pad.

In one embodiment, the thermochromic coloring pad contains at least one sheet made of synthetic resin supporting a thermochromic material. The support may be, for example, in support of a coating applied onto the sheet or as part of a polymer matrix into which a thermochromic pigment is mixed. The thermochromic material has a color activation temperature above 0° C. and a color deactivation temperature of less than human body temperature. Thus, the thermochromic material is selectively activatable such that the sheet may be cooled to achieve full color activation whereupon a subtraction image may be drawn on the sheet by contacting the sheet with human fingers. Alternatively, using this same structure the sheet may be heated to a point above the color deactivation temperature whereupon a positive image may be drawn on the sheet by contacting the sheet with a writing instrument that is chilled to a temperature less than the color activation temperature.

In a preferred embodiment, the color activation temperature of the thermochromic material ranges from 12° C. to 19° C. and the color deactivation temperature ranges from 23° C. to 35° C.

In one aspect, the coloring pad is formed as a laminate made of a plurality of the sheets described above. Each sheet may have a different thermochromic material. Thus, there can be combinations of colors depending upon the developed intensity as human fingers or a cooled writing instrument contacts the surface of the pad, and these may vary depending upon the speed of passage over the surface of the writing pad.

In one embodiment, the pad may contain a predetermined indicia providing background for an educational game or exercise. Selective color activation or deactivation of the thermochromic material provides an interactive dimension to the educational game or exercise. This may be, for example, a connect-the-dot pattern, a bingo game, lining for practice of the alphabet, or figure outlines in the nature of a coloring book.

In one embodiment, the coloring pad may be provided with a plurality of thermochromic materials providing an array formed of discrete elements. Each of the elements is allocated to a particular color corresponding to one of the plurality of thermochromic materials. Each of the thermochromic materials has different colors and/or different thermal activation/deactivation performance, such that a mixture of colors and color intensities may be achieved by selectively activating or deactivating elements of the array.

A writing instrument that is useful in practicing the aforementioned instrumentalities is formed of a housing. The housing provides a sidewall that defines an interior chamber of constant dimension in an axial direction, a cap extending transversely to the axial direction, and an open end remote from the cap. A screw assembly is retained by the cap and extends axially therethrough into the interior chamber. A diaphragm is mounted in the interior chamber and is threadably engaged with the screw assembly, such that selective rotation of the screw assembly moves the diaphragm axially within the interior chamber. Ice residing within the interior chamber is advance out the open end for writing purposes by turning the screw assembly.

The writing instrument may also be a cylindrical tube made of a thin membrane of a flexible polymer filled with water and another chemical to depress the freezing point of the water below 0° Celsius: water and tripropylene glycol. The writing instrument is a permanently sealed instrument. It can be activated to a subzero temperature in a standard refrigerator freezer. Because the instrument will be –10 to –20 degrees Celsius, the outer covering of the writing instrument will be covered in an insulating foam to protect the user from the low temperature while handling the instrument.

The coloring pad is used by exposing the pad to a temperature that renders the thermochromic material to one of a color activated state or a color deactivated state. When the thermochromic material is in the color activated state, human fingers provide heat to deactivate the color and so also draw an image on the pad. When the thermochromic material is in the color deactivated state, a cooled writing instrument may be used to draw an image on the pad by the use of a cooled writing instrument. This image may be subsequently erased by the application of human fingers to provide heat that deactivates the color.

DETAILED DESCRIPTION

Figure 1:
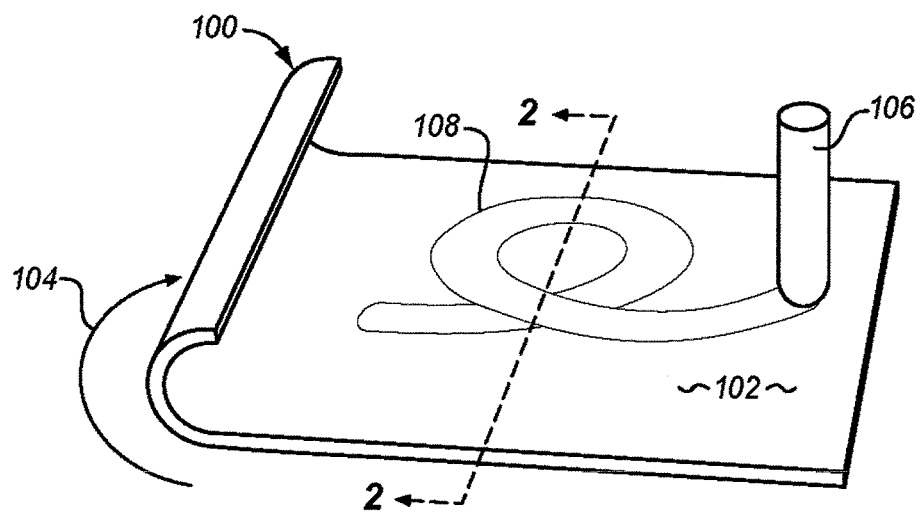
FIG. 1 shows a thermochromically activatable coloring pad.

FIG. 1 shows a coloring pad 100 presenting a thermochromically responsive surface 102. The pad is flexible so that it may be rolled up or folded for storage as indicated by arrow 104. An object 106, such as a cooled writing instrument or a human finger, modulates the temperature of surface 102 to induce a thermochromic color activation response or color deactivation response resulting in indicia 108.

Figure 2:
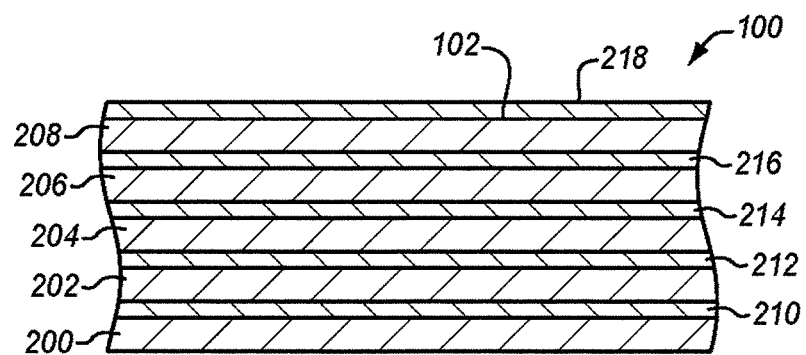
FIG. 2 is a midsectional view of the coloring pad taken along line 2-2' of FIG. 1.

FIG. 2 is a midsectional view taken along line 2'-2' of FIG. 1. The pad 100 is formed as a laminate including one or more sheets 200, 202, 204, 206, 208 interspersed by connecting layers 210, 212, 214, 216 that adhere the sheets 200-208 to one another. An optional top layer 218 is provided. The layers 210-218 contain thermochromic pigment that has a color response modulated by the heating or cooling of object 106.

Figure 3:
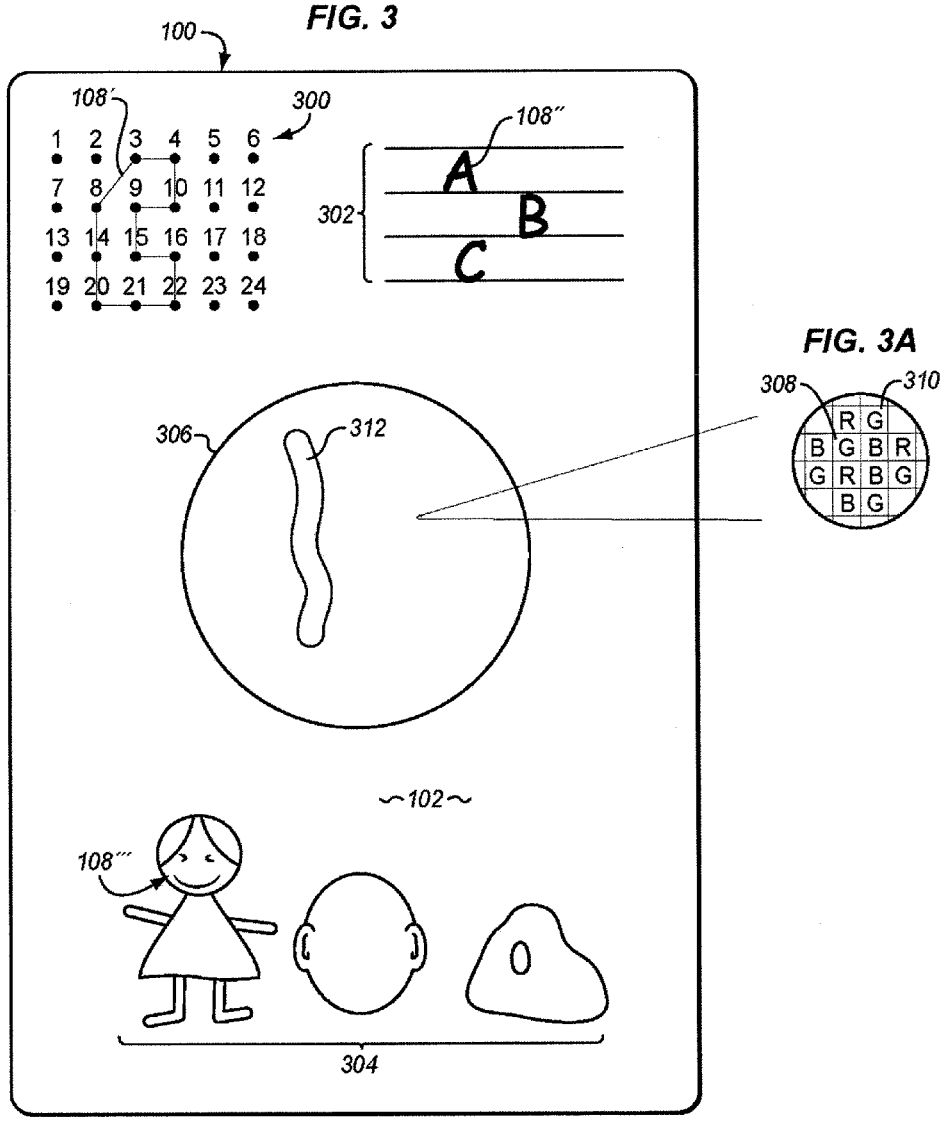
FIG. 3 shows various predetermined indicia that may be provided on a surface of the coloring pad for interaction with thermochromically produced indicia on the surface of the coloring pad.

FIG. 3 shows surface 102 from a plan view according to one embodiment. By way of example, the surface 102 may be provided with any type of predetermined background indicia for interaction with the indicia 108. One example of this is a connect-the-dot game 300 where the indicia 108' takes the form of a letter "C" Another example is lining 302 for the indicia 108" in practicing the alphabet. Yet another example is the provision of outlines 304 for coloring where the indicia 108''' may be facial features 108''''.

Array 306 is an area of mixed coloring formed of discrete color elements as depicted in expanded scale according to FIG. 3A. The elements 308, 310 are printed a coloring scheme, which in this case is Red-Green-Blue or RGB. Element 308 is red according the designation "R.". Element 310 is green according to the designation "G." The thermochromic pigments in the respective R, G and B elements of the array 306 have different activation and deactivation temperatures. Accordingly, the color and intensity of track 312, which is drawn by object 106 (see FIG. 1), may vary depending upon the speed and temperature of object 106 as it traverses surface 102. The array 306 may be printed, for example, to form the optional top layer 218 of FIG. 2 in an embodiment where neither sheets 200-206 nor layers 210-216 are required.

Alternatively, it will be appreciated that the sheets 200-206 and layers 210-216 may be provided in any number in situations where the layers 210-216 are mixed with thermochromic pigments. In one embodiment, each of the layers 210-216 may have a different developed color and the layers 210-216 may differ as well in their respective color activation and deactivation temperatures. In this way also, the color and intensity of track 312, may vary depending upon the speed and temperature of object 106 as it traverses surface 102.

Figure 4:
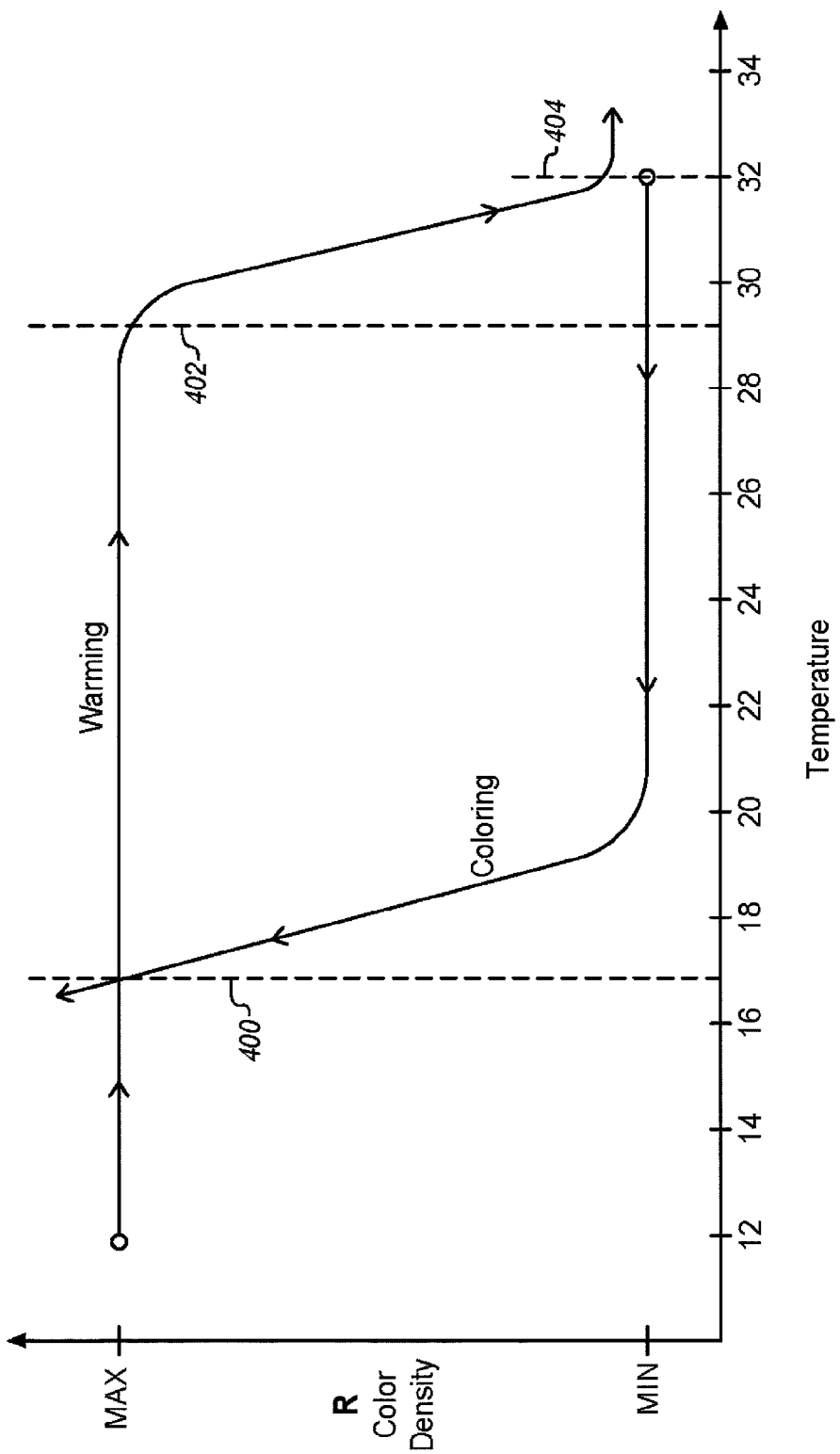
FIG. 4 shows a thermochromic hysteresis curve for a red pigment.
Figure 5:
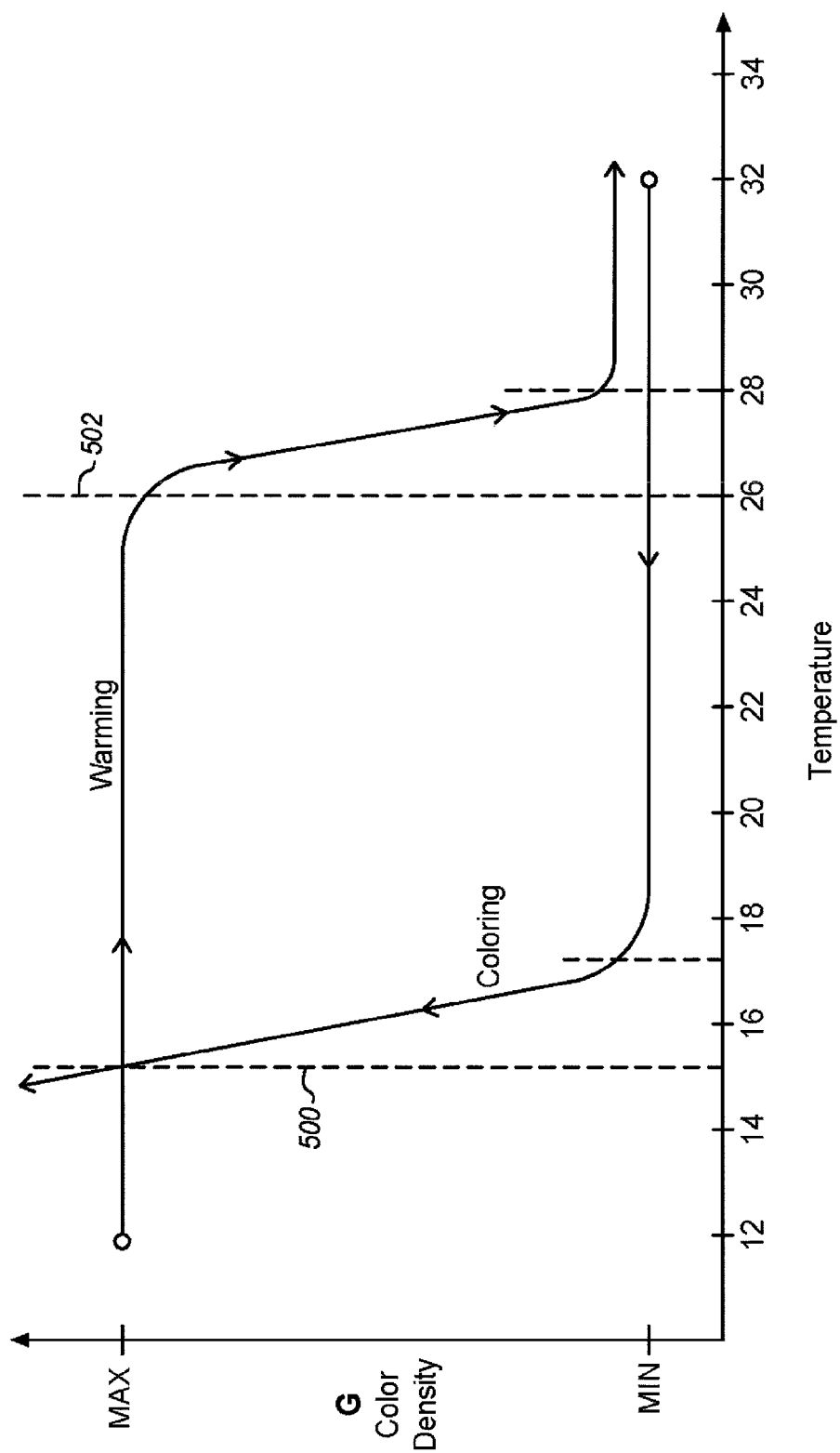
FIG. 5 shows a thermochromic hysteresis curve for a green pigment.
Figure 6:
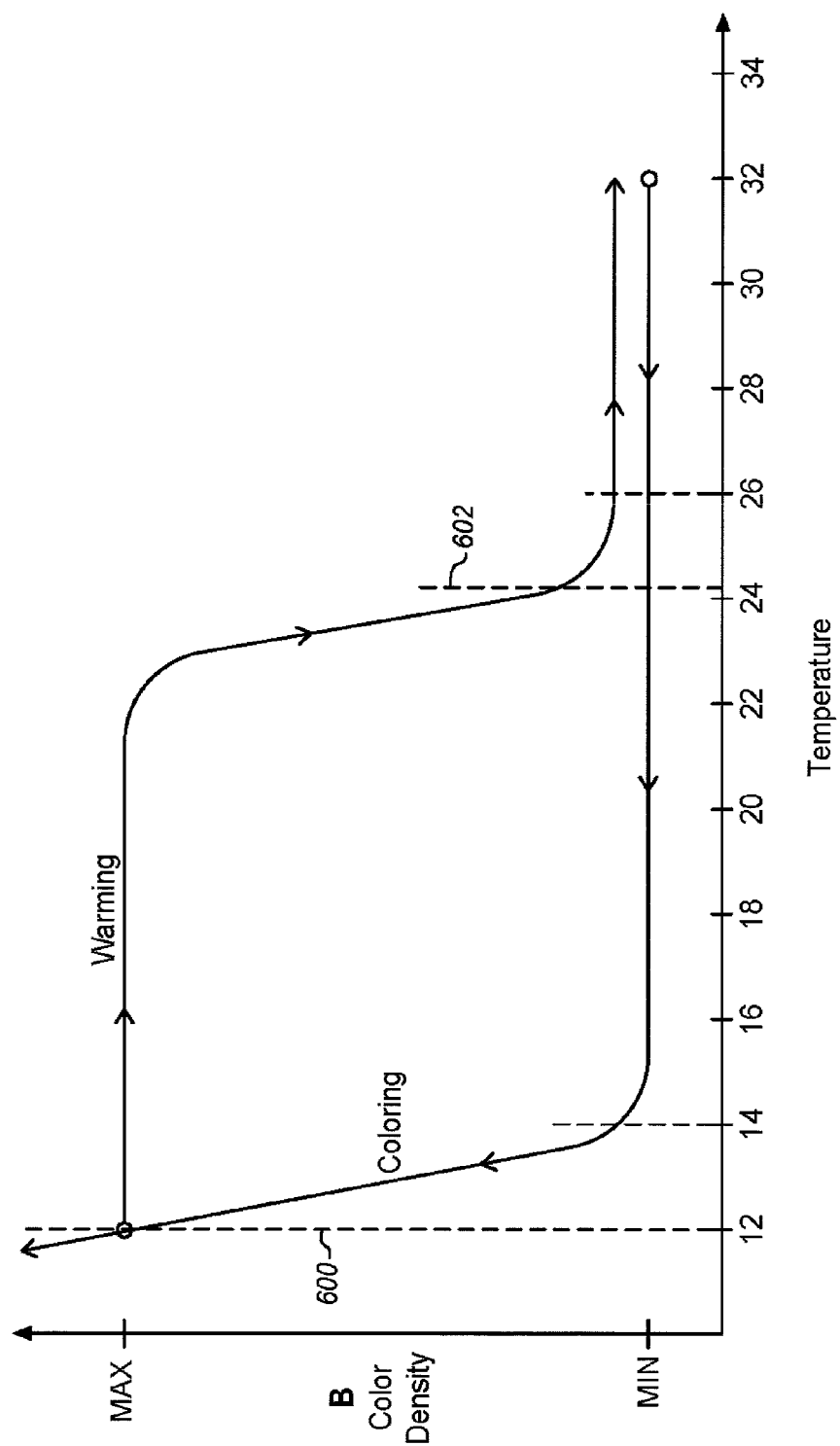
FIG. 6 shows a thermochromic hysteresis curve for a blue pigment.

FIGS. 4-6 show, by way of example, the thermochromic hysteresis behavior of thermochromic pigments that are formulated for use as described above. Taken altogether, FIGS. 4-6 show that thermochromic pigments with different thermal response profiles may be used in combination to provide variations in color that may differ depending upon the speed at which the object 106 traverses surface 102 (see FIG. 1).

FIG. 4 indicates a red pigment response having a color activation along the cooling curve from 20° C. to 16.5° C., with full color development 400 at 16.5° C. The developed color stays red along the warming cycle until color deactivation commences 402 at 29° C. and the color is fully deactivated at 32° C.

FIG. 5 indicates a green pigment response having a color activation along the cooling curve from 17° C. to 15° C., with full color development 500 at 17° C. The developed color stays green along the warming cycle until color deactivation commences 502 at 26° C. and the color is fully deactivated at 28° C.

FIG. 6 indicates a blue pigment response having a color activation along the cooling curve from 14° C. to 12° C., with full color development 600 at 12° C. The developed color stays blue along the warming cycle until color deactivation commences 602 at about 24° C. and the color is fully deactivated at 26° C.

Liquid coating materials for use in forming layers 210-216 may be purchased on commercial order from Chromatic Technologies, Inc. of Colorado Springs, Colo. The color and thermal hysteresis behavior may be adjusted by design using the principles described below.

Thermochromic coatings useful in the layers 210-218 contain microcapsules, which encapsulate a thermochromic system mixed with a solvent. The thermochromic system has a material property of a thermally conditional hysteresis window that presents a thermal separation. These coatings may be improved according to the instrumentalities described herein by using a co-solvent that is combined with the thermochromic system. The thermochromic system may contain, for example, at least one chromatic organic compound and co-solvents.

One example of a thermochromic system includes a leuco dye having a lactone ring structure and a phenolic developer. Within the encapsulated thermochromic systems, complexes form between the dye and the weak acid developer that allow the lactone ring structure of the leuco dye to be opened. The nature of the complex is such that the hydroxyl groups of the phenolic developer interact with the open lactone ring structure forming a supra-molecular structure that orders the dyes and developers such that a color is formed. Color forms from this supra-molecular structure because the dye molecule in the ring open structure is cationic in nature and the molecule has extended conjugation allowing absorption in the visible spectrum thus producing a colored species. The color that is perceived by the eye is what visible light is not absorbed by the complex. The nature of the dye/developer complex depends on the molar ratio of dye and developer. The stability of the colored complex is determined by the affinity of the solvent for itself, the developer or the dye/developer complex. In a solid state, below the full color point, the dye/developer complex is stable. In the molten state, the solvent destabilizes the dye/developer complex and the equilibrium is more favorably shifted towards a developer/solvent complex. This happens at temperatures above the full color point because the dye/developer complex is disrupted and the extended conjugation of the it cloud electrons that allow for the absorption of visible light are destroyed.

The melting and crystallization profile of the solvent system determines the nature of the thermochromic system. The full color point of the system occurs when the maximum amount of dye is developed. In a crystallized solvent state, the dye/developer complex is favored where the dye and developer exist in a unique crystallized structure, often intercalating with one another to create an extended conjugated it system. In the molten state, the solvent(s), in excess, have enough kinetic energy to disrupt the stability of the dye/developer complex, and the thermochromic system becomes decolorized.

The addition of a co-solvent with a significantly higher melting point than the other dramatically changes the melting properties of both the solvents. By mixing two solvents that have certain properties, a blend can be achieved that possesses a eutectic melting point. The melting point of a eutectic blend is lower than the melting point of either of the co-solvents alone and the melting point is sharper, occurring over a smaller range of temperatures. The degree of the destabilization of the dye/developer complex can be determined by the choice of solvents. By creating unique eutectic blends, both the clearing point and the full color point can be altered simultaneously. The degree of hysteresis is then shifted in both directions simultaneously as the sharpness of the melting point is increased.

Temperature changes in thermochromic systems are associated with color changes. If this change is plotted on a graph having axes of temperature and color, the curves do not align and are offset between the heating cycle and the cooling cycle. The entire color versus temperature curve has the form of a loop. Such a result shows that the color of a thermochromic system does not depend only on temperature, but also on the thermal history, i.e. whether the particular color was reached during heating or during cooling. This phenomenon is generally referred to as a hysteresis cycle and specifically referred to herein as color hysteresis or the hysteresis window. Decreasing the width of this hysteresis window to approximately zero would allow for a single value for the full color point and a single value for the clearing point. This would allow for a reliable color transition to be observed regardless of whether the system is being heated or cooled. Nonetheless, the concept decreasing separation across the hysteresis window is elusive in practice. Thus, it is an object of the present disclosure to provide thermochromic systems with a reduced hysteresis window achieved by shifting both the full color point and the clearing point or color deactivation temperature, for example.

Leuco Dyes

Leuco dyes most commonly used as color formers in thermochromic systems of the present disclosure include, but are not limited to, generally; spirolactones, fluorans, spiropyrans, and fulgides; and more specifically; diphenylmethane phthalide derivatives, phenylindolylphthalide derivatives, indolylphthalide derivatives, diphenylmethane azaphthalide derivatives, phenylindolylazaphthalide derivatives, fluoran derivatives, styrynoquinoline derivatives, and diazarhodamine lactone derivatives which can include: 3,3-bis(p-dimethylaminophenyl)-6-dimethylaminophthalide; 3-(4-diethylaminophenyl)-3-(1-ethyl-2-methylindol-3-yl) phthalide; 3,3-bis(1-n-butyl-2-methylindol-3-yl)phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-dimethoxyfluoran; 3,6-di-n-butoxyfluoran; 2-methyl-6-(N-ethyl-N-p-tolylamino)fluoran; 3-chloro-6-cyclohexylaminofluoran; 2-methyl-6-cyclohexylaminofluoran; 2-(2-chloroanilino)-6-di-n-butylamino fluoran; 2-(3-trifluoromethylanilino)-6-diethylaminofluoran; 2-(N-methylanilino)-6-(N-ethyl-N-p-tolylamino)fluoran, 1,3-dimethyl-6-diethylaminofluoran; 2-chloro-3-methyl-6-diethylamino fluoran; 2-anilino-3-methyl-6-diethylaminofluoran; 2-anilino-3-methyl-6-di-n-butylamino fluoran; 2-xylidino-3-methyl-6-diethylaminofluoran; 1,2-benzo-6-diethylaminofluoran; 1,2-benzo-6-(N-ethyl-N-isobutylamino)fluoran,1,2-benzo-6-(N-ethyl-N-isoamylamino)fluoran; 2-(3-methoxy-4-dodecoxystyryl)quinoline;

spiro[5H-(1) benzopyrano(2,3-d)pyrimidine-5,1'(3'H) isobenzofuran]-3'-one; 2-(diethylamino)-8-(diethylamino)-4-methyl-spiro[5H-(1)benzopyrano(2,3-d)pyrimidine-5,1' (3'H)isobenzofuran]-3'-one; 2-(di-n-butylamino)-8-(di-n-butylamino)-4-methyl-spiro[5H-(1)benzopyrano(2,3-d) pyrimidine-5,1'(3'H)isobenzofuran]-3'-one; 2-(di-n-butylamino)-8-(diethylamino)-4-methyl-spiro[5H-(1) benzopyrano(2,3-d)pyrimidine-5,1'(3'H)isobenzofuran]-3'-one; 2-(di-n-butylamino)-8(N-ethyl-N-isoamylamino)-4-methyl-spiro[5H-(1)benzopyrano(2,3-d)pyrimidine-5,1' (3'H)isobenzofuran]-3'-one; and 2-(di-n-butylamino)-8-(di-n-butylamino)-4-phenyl and trisubstituted pyridines.

Developers

Weak acids that can be used as color developers act as proton donors, changing the dye molecule between its leuco form and its protonated colored form; stronger acids make the change irreversible. Examples of developers used in the present disclosure include but are not limited to: bisphenol A; bisphenol F; tetrabromobisphenol A; 1'-methylenedi-2-naphthol; 1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl) cyclohexane; 1,3-bis[2-(4-hydroxyphenyl)-2-propyl] benzene; 1-naphthol; 2-naphthol; 2,2 bis(2-hydroxy-5-biphenylyl)propane; 2,2-bis(3-cyclohexyl-4-hydroxy) propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 4,4'-(1,3-Dimethylbutylidene)diphenol; 4,4'-(2-Ethylidene) diphenol; 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-methylidenebis(2-methylphenol); 4-(1,1,3,3-tetramethylbutyl)phenol; 4-phenylphenol; 4-tert-butylphenol; 9,9-bis(4-hydroxyphenyl)fluorine; 4,4'-(ethane-1,1-diyl)diphenol; alpha,alpha'-bis (4-hydroxyphenyl-1,4-diisopropylbenzene; alpha,alpha,alpha'-tris(4-hydroxyphenyl)-1-ethyl-4-isopropylbenzene; benzyl 4-hydroxybenzoate; bis(4-hydroxyphenyl)sulfide; bis (4-hydroxyphenyl)sulfone; propyl 4-hydroxybenzoate; methyl 4-hydroxybenzoate; resorcinol; 4-tert-butyl-catechol; 4-tert-butyl-benzoic acid; 1,1'-methylenedi-2-naphthol 1,1, 1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl)cyclohexane; 1,3-bis[2-(4-hydroxyphenyl)-2-propyl]benzene; 1-naphthol 2,2'-biphenol; 2,2-bis(2-hydroxy-5-biphenylyl)propane; 2,2-bis(3-cyclohexyl-4-hydroxyphenyl)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl) propane; 2,2-bis(4-hydroxyphenyl)propane; 2,3,4-trihydroxydiphenylmethane; 2-naphthol; 4,4'-(1,3-dimethylbutylidene)diphenol; 4,4'-(2-ethylhexylidene) diphenol 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-ethylidenebisphenol; 4,4'-methylenebis(2-methylphenol); 4-(1,1,3,3-tetramethylbutyl)phenol; 4-phenylphenol; 4-tert-butylphenol; 9,9-bis(4-hydroxyphenyl)fluorine; alpha,alpha'-bis(4-hydroxyphenyl)-1,4-diisopropylbenzene; $\alpha,\alpha,\alpha$-tris(4-hydroxyphenyl)-1-ethyl-4-isopropylbenzene; benzyl 4-hydroxybenzoate; bis(4-hydroxyphenyl)sulfidem; bis(4-hydroxyphenyl) sulfone methyl 4-hydroxybenzoate; resorcinol; tetrabromobisphenol A; 3,5-di-tertbutyl-salicylic acid; zinc 3,5-di-tertbutylsalicylate; 3-phenyl-salicylic acid; 5-tertbutyl-salicylic acid; 5-n-octyl-salicylic acid; 2,2'-biphenol; 4,4'-di-tertbutyl-2,2'-biphenol; 4,4'-di-n-alkyl-2,2'-biphenol; and 4,4'-di-halo-2,2'-biphenol, wherein the halo is chloro, fluoro, bromo, or iodo.

Solvents

The best solvents to use within the thermochromic system are those that have low reactivity, have a relatively large molecular weight (i.e. over 100), and which are relatively non-polar. Very low molecular weight aldehydes, ketones, diols and aromatic compounds should not be used as solvents within the thermochromic system.

Thermochromic coatings disclosed herein use a co-solvent that is combined with the thermochromic system. This material may be provided in an effective amount to reduce the thermal separation in the overall coating to a level less than eighty percent of separation that would otherwise occur if the material were not added. This effective amount may range, for example from the 12% to 15% by weight of the composition.

The addition of a co-solvent with a significantly higher melting point than the other dramatically changes the melting properties of both the solvents. By mixing two solvents that have certain properties, a blend can be achieved that possesses a eutectic melting point. The melting point of a eutectic blend is lower than the melting point of either of the co-solvents alone and the melting point is sharper, occurring over a smaller range of temperatures. The degree of the destabilization of the dye/developer complex can be determined by the choice of solvents. By creating unique eutectic blends, both the clearing point and the full color point can be altered simultaneously. The degree of hysteresis is then shifted in both directions simultaneously as the sharpness of the melting point is increased. Copending application Ser. No. 13/363,070 filed Jan. 31, 2012 discloses thermochromic systems with controlled hysteresis, and is hereby incorporated by reference to the same extent as though fully replicated herein. According to the instrumentalities described therein, the microencapsulate pigments may be formulated to have color transition temperatures across a hysteresis window of less than five degrees centigrade or more than 60 or 80 degrees centigrade.

Properties of at least one of the co-solvents used in the present disclosure include having a long fatty tail of between 12 and 24 carbons and possessing a melting point that is about 70° C. to about 200° C. greater than the co-solvent partner. The co-solvents are preferably also completely miscible at any ratio.

Solvents and/or co-solvents used in thermochromic generally may include, but are not limited to, sulfides, ethers, ketones, esters, alcohols, and acid amides. These solvents can be used alone or in mixtures of 2 or more. Examples of the sulfides include: di-n-octyl sulfide; di-n-nonyl sulfide; di-n-decyl sulfide; di-n-dodecyl sulfide; di-n-tetradecyl sulfide; di-n-hexadecyl sulfide; di-n-octadecyl sulfide; octyl dodecyl sulfide; diphenyl sulfide; dibenzyl sulfide; ditolyl sulfide; diethylphenyl sulfide; dinaphthyl sulfide; 4,4'-dichlorodiphenyl sulfide; and 2,4,5,4'tetrachlorodiphenyl sulfide. Examples of the ethers include: aliphatic ethers having 10 or more carbon atoms, such as dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether; alicyclic ethers such as s-trioxane; and aromatic ethers such as phenylether, benzyl phenyl ether, dibenzyl ether, di-p-tolyl ether, 1-methoxynaphthalene, and 3,4,5trimethoxytoluene.

Examples of ketone solvents include: aliphatic ketones having 10 or more carbon atoms, such as 2-decanone, 3-decanone, 4-decanone, 2-undecanone, 3-undecanone, 4-undecanone, 5-undecanone, 6-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone; aryl alkyl ketones having 12 to 24 carbon atoms, such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone; aryl aryl ketones such as benzophenone, benzyl phenyl ketone, and dibenzyl ketone; and alicyclic ketones such as cyclooctanone, cyclododecanone, cyclopentadecanone, and 4-tert-butylcyclohexanone, ethyl caprylate, octyl caprylate, stearyl caprylate, myristyl caprate, stearyl caprate, docosyl caprate, 2-ethylhexyl laurate, n-decyl laurate, 3-methylbutyl myristate, cetyl myristate, isopropyl palmitate, neopentyl palmitate, nonyl palmitate, cyclohexyl palmitate, n-butyl stearate, 2-methylbutyl stearate, stearyl behenate 3,5,5-trimethylhexyl stearate, n-undecyl stearate, pentadecyl stearate, stearyl stearate, cyclohexylmethyl stearate, isopropyl behenate, hexyl behenate, lauryl behenate, behenyl behenate, cetyl benzoate, stearyl p-tert-butylbenzoate, dimyristyl phthalate, distearyl phthalate, dimyristyl oxalate, dicetyl oxalate, dicetyl malonate, dilauryl succinate, dilauryl glutarate, diundecyl adipate, dilauryl azelate, di-n-nonyl sebacate, 1,18-dineopentyloctadecylmethylenedicarboxylate, ethylene glycol dimyristate, propylene glycol dilaurate, propylene glycol distearate, hexylene glycol dipalmitate, 1,5-pentanediol dimyristate, 1,2,6-hexanetriol trimyristate, 1,4-cyclohexanediol didecanoate, 1,4-cyclohexanedimethanol dimyristate, xylene glycol dicaprate, and xylene glycol distearate.

Ester solvents can be selected from esters of a saturated fatty acid with a branched aliphatic alcohol, esters of an unsaturated fatty acid or a saturated fatty acid having one or more branches or substituents with an aliphatic alcohol having one or more branches or 16 or more carbon atoms, cetyl butyrate, stearyl butyrate, and behenyl butyrate including 2-ethylhexyl butyrate, 2-ethylhexyl behenate, 2-ethylhexyl myristate, 2-ethylhexyl caprate, 3,5,5-trimethylhexyl laurate, 3,5,5-trimethylhexyl palmitate, 3,5,5-trimethylhexyl stearate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methylpentyl laurate, 2-methylbutyl stearate, 2-methylbutyl stearate, 3-methylbutyl stearate, 2-methylheptyl stearate, 2-methylbutyl behenate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, stearyl oleate, behenyl oleate, stearyl linoleate, behenyl linoleate, 3,7-dimethyloctyl erucate, stearyl erucate, isostearyl erucate, cetyl iso stearate, stearyl iso stearate, 2-methylpentyl 12-hydroxystearate, 2-ethylhexyl 18-bromo stearate, isostearyl 2-ketomyristate, 2-ethylhexyl-2-fluoromyristate, cetyl butyrate, stearyl butyrate, and behenyl butyrate.

Examples of the alcohol solvents include monohydric aliphatic saturated alcohols such as decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, behenyl alcohol and docosyl alcohol; aliphatic unsaturated alcohols such as allyl alcohol and oleyl alcohol, alicyclic alcohols such as cyclopentanol, cyclohexanol, cyclooctanol, cyclododecanol, and 4-tert-butylcyclohexanol; aromatic alcohols such as 4-methylbenzyl alcohol and benzhydrol; and polyhydric alcohols such as polyethylene glycol. Examples of the acid amides include acetamide, propionamide, butyramide, capronamide, caprylamide, capric amide, lauramide, myristamide, palmitamide, stearamide, behenamide, oleamide, erucamide, benzamide, capronanilide, caprylanilide, capric anilide, lauranilide, myristanilide, palmitanilide, stearanilide, behenanilide, oleanilide, erucanilide, N-methylcapronamide, N-methylcaprylamide, N-methyl (capric amide), N-methyllauramide, N-methylmyristamide, N-methylpalmitamide, N-methylstearamide, N-methylbehenamide, N-methyloleamide, N-methylerucamide, N-ethyllauramide, N-ethylmyristamide, N-ethylpalmitamide, N-ethylstearamide, N-ethyloleamide, N-butyllauramide, N-butylmyristamide, N-butylpalmitamide, N-butylstearamide, N-butyloleamide, N-octyllauramide, N-octylmyristamide, N-octylpalmitamide, N-octylstearamide, N-octyloleamide, N-dodecyllauramide, N-dodecylmyristamide, N-dodecylpalmitamide, N-dodecylstearamide, N-dodecyloleamide, dilauroylamine, dimyristoylamine, dipalmitoylamine, distearoylamine, dioleoylamine, trilauroylamine, trimyristoylamine, tripalmitoylamine, tristearoylamine, trioleoylamine, succinamide, adipamide, glutaramide, malonamide, azelamide, maleamide, N-methylsuccinamide, N-methyladip amide, N-methylglutaramide, N-methylmalonamide, N-methylazelamide, N-ethylsuccinamide, N-ethyladipamide, N-ethylglutaramide, N-ethylmalonamide, N-ethylazelamide, N-butylsuccinamide, N-butyladipamide, N-butylglutaramide, N-butylmalonamide, N-octyladipamide, and N-dodecyladipamide.

Among these solvents, it has been discovered that certain solvents have the effect of reducing the hysteresis window. The solvent may be material combined with the thermochromic system, for example, to reduce thermal separation across the hysteresis window to a level demonstrating 80%, 70%, 50%, 40%, 30% or less of the thermal separation that would exist if the co-solvent were not present. The co-solvent is selected from the group consisting of derivatives of mysristic acid, derivatives of behenyl acid, derivatives of palmytic acid and combinations thereof. Generally, these materials include myristates, palmitates, behenates, together with myristyl, stearyl, and behenyl materials and certain alcohols. In one aspect, these materials are preferably solvents and co-solvents from the group including isopropyl myristate, isopropyl palmitate, methyl palmitate, methyl stearate, myristyl myristate, cetyl alcohol, stearyl alcohol, behenyl alcohol, stearyl behenate, and stearamide. These co-solvents are added to the encapsulated thermochromic system in an amount that, for example, ranges from 9% to 18% by weight of the thermochromic system as encapsulated, i.e., excluding the weight of the capsule. This range is more preferably from about 12% to about 15% by weight.

Light Stabilizers

Thermochromic coatings containing leuco dyes are available for all major coating types such as water-based, ultraviolet cured and epoxy. The properties of these coatings differ from process coatings. For example, most thermochromic coatings contain the thermochromic systems as microcapsules, which are not inert and insoluble as are ordinary process pigments. The size of the microcapsules containing the thermochromic systems ranges typically between 3-5 µm which is more than 10-times larger than regular pigment particles found in most coatings. The post-print functionality of thermochromic coatings can be adversely affected by ultraviolet light, temperatures in excess of 140° C. and aggressive solvents. The lifetime of these coatings is sometimes very limited because of the degradation caused by exposure to ultraviolet light from sunlight.

In other instances, additives used to fortify the encapsulated thermochromic systems by imparting a resistance to degradation by ultraviolet light by have a dual functionality of also reducing the width of separation over the hysteresis window. Light stabilizers are additives which prevent degradation of a product due to exposure to ultraviolet radiation. Examples of light stabilizers used in thermochromic systems of the present disclosure and which may also influence the hysteresis window include but are not limited to: avobenzone, bisdisulizole disodium, diethylaminohydroxybenzoyl hexyl benzoate, Ecamsule, methyl anthranilate, 4-aminobenzoic acid, Cinoxate, ethylhexyl triazone, homosalate, 4-methylbenzylidene camphor, octyl methoxycinnamate, octyl salicylate, Padimate O, phenylbenzimidazole sulfonic acid, polysilicone-15, trolamine salicylate, bemotrizinol, benzophenones 1-12, dioxybenzone, drometrizole trisiloxane, iscotrizinol, octocrylene, oxybenzone, sulisobenzone, bisoctrizole, titanium dioxide and zinc oxide.

Careful preparation of encapsulated reversible thermochromic material enhances coating stability in the presence of low molecular weight polar solvents that are known to adversely affect thermochromic behavior. One skilled in the art of microencapsulation can utilize well-known processes to enhance the stability of the microcapsule. For example, it is understood that increasing the cross linking density will reduce the permeability of the capsule wall, and so also reduces the deleterious effects of low molecular weight solvents. It is also commonly understood that, under certain conditions, weak acids with a pKa greater than about 2 may catalyze microcapsule wall polymerization and increase the resulting cross linking density. It is presently the case that using formic acid as a catalyst enhances solvent stability of blue thermochromic microcapsules in the presence of low molecular weight ketones, diols, and aldehydes at room temperature. Further, it is well understood that increasing the diameter of the thermochromic microcapsule can result in enhanced solvent stability.

The selection of material for use as the non-polar solvent for the thermochromic dye and color developer that is encapsulated within the thermochromic pigment determines the temperature at which color change is observed. For example, changing the solvent from a single component to a two component solvent system can shift the temperature at which full color is perceived almost 7° C. from just under 19° C. to 12° C. The present disclosure shows how to apply this knowledge in preparing resin-based vehicle coatings for use in can and coil coatings with full color temperatures, i.e., the temperature at which maximum color intensity is observed, as low as −5° C. and as high as 65° C. No adverse effects on the physical properties of the resulting coating were observed as the full color temperature was changed over the above range by the use of different straight chain alkyl esters, alcohols, ketones or amides.

Thermochromic materials including encapsulated thermochromic systems with a variety of color properties may be purchased on commercial order from such companies as Chromatic Technologies, Inc., of Colorado Springs, Colo.

Control over observed color intensity is demonstrated in several ways, generally by providing increased amounts of pigment. For a typical coating, material thickness ranges from 1 mg/in2 to 6 mg/in2. Very intense color is observed for coatings with thickness greater than about 3 mg/in2. Increasing thermochromic pigment solids can also result in a more intense observed color even when coating thickness is decreased. However, dried film properties such as flexibility and toughness may be compromised if too much thermochromic pigment is incorporated. The optimal range of thermochromic pigment solids is within 5 to 40% by weight of the coating.

Vehicle

Physical properties of the finished coating can be significantly affected by the selection of resin to be used. When no resin is used in formulating a reversible thermochromic coating, a matte finish is achieved that is able to be formed into can ends, tabs, caps and/or other closures. While this result may be desired, the inclusion of a low viscosity, relatively low molecular weight resin, monomer, oligomer, polymer, or combination thereof, can enhance gloss and affect other physical film properties such as hardness, flexibility and chemical resistance. The resin is designed to supplement the total solids deposited on the substrate, thus impacting the physical properties of the dried film. Any resin material, monomer, oligomer, polymer, or combination thereof that can be polymerized into the commercially available can and coil coating material is suitable for inclusion in the formulation of the current reversible thermochromic can and coil coating. Acceptable classes of resins include, but are not limited to polyester, urethane, acrylic acid and acrylate, or other types of resin systems with suitably high solids content.

Encapsulation Process

Nearly all thermochromic systems require encapsulation for protection. As is known in the art, the most common process for encapsulation is interfacial polymerization. During interfacial polymerization the internal phase (material inside the capsule), external phase (wall material of the capsule) and water are combined through high-speed mixing. By controlling all the temperature, pH, concentrations, and mixing speed precisely, the external phase will surround the internal phase droplet while crosslinking with itself. Usually the capsules are between 3-5 µm or smaller. Such small sizes of capsules are referred to as microcapsules and the thermochromic system within the microcapsules are microencapsulated. Microencapsulation allows thermochromic systems to be used in wide range of materials and products. The size of the microcapsules requires some adjustments to suit particular printing and manufacturing processes.

The size distribution of microcapsules can range from as much as 0.2 µm to 100 µm. Further example techniques of physical microencapsulation include but are not limited to pan coating, air suspension coating, centrifugal extrusion, vibration nozzle, and spray drying. Examples of chemical microencapsulation techniques include but are not limited to interfacial polymerization, in-situ polymerization, and matrix polymerization. Example polymers used in the preferred chemical microencapsulation include but are not limited to polyester, polyurethane, polyureas, urea-formaldehyde, epoxy, melamine-formaldehyde, polyethylene, polyisocyanates, polystyrene, polyamides, and polysilanes.

The capsule isolates the thermochromic system from the environment, but the barrier that the capsule provides is itself soluble to certain solvents. Therefore, the microcapsule constituents interact with the environment to some extent. The solubility parameter describes how much a material will swell in the presence of different solvents. This swelling will directly impact the characteristics of the reaction potential within the capsule, as well as potentially making the capsule more permeable, both of which will likely adversely affect the thermochromic system. Solvents in which the microcapsules are exposed to are chosen so as not to destroy, or affect, the thermochromic system within.

The capsule is hard, thermally stable and relatively impermeable. The infiltration of compounds through the capsule are stopped or slowed to the point that the characteristics of the dye are not affected. The pollution of the thermochromic system within the capsule by solvents from the environment affects the shelf life of the thermochromic system. Therefore, the formulation of the applied thermochromic system, as a coating for example, should be carefully considered.

In an embodiment of the present disclosure, capsules are made from urea formaldehyde. One technique used to produce the encapsulated thermochromic systems is to combine water, dye, oil, and urea formaldehyde and mix to create a very fine emulsification. Because of the properties of the compounds, the oil and dye end up on the inside of the capsule and the water ends up on the outside, with the urea formaldehyde making up the capsule itself. The capsule can then be thermo-set, similar to other resins, such as formica. The thermo-set substance is very hard and will not break down, even at temperatures higher than the encapsulated thermochromic system is designed to be exposed to. The urea formaldehyde capsule is almost entirely insoluble in most solvents, but it is permeable to certain solvents that might destroy the ability of the thermochromic system to color and decolorize throughout a temperature range.

The extent to which capsules will react with their environment is influenced by the pH of the surrounding medium, the permeability of the capsule, the polarity and reactivity of compounds in the medium, and the solubility of the capsule. Preferred media used in formulating encapsulated thermochromic system are engineered to reduce the reactivity between that medium and the capsules to a low enough level that the reactivity will not influence the characteristics of the dye for an extended period of time.

Highly polar solvent molecules, with the exception of water, often interact more with the leuco dye than with the capsule shell and other non-polar molecules of the thermochromic system. Therefore, polar solvents that are able to cross the capsule barrier should, in general, be eliminated from the medium within which the encapsulated thermochromic system is formulated.

Aqueous media that the encapsulated thermochromic systems are placed within should have a narrow pH range from about 6.5 to about 7.5. When an encapsulated thermochromic system is added to a formulation that has a pH outside this range, often the thermochromic properties of the system are destroyed. This is an irreversible effect.

One aspect of the present disclosure is for a method of improving the formulations of the thermochromic system by removing any aldehydes, ketones, and diols and replacing them with solvents which do not adversely affect the thermochromic system. Solvents having a large molecular weight (i.e. greater than 100) generally are compatible with the thermochromic systems. The acid content of the system is preferably adjusted to an acid number below 20 or preferably adjusted to be neutral, about 6.5-7.5. Implementing these solvent parameters for use in the thermochromic system will preserve the reversible coloration ability of the leuco dyes.

Formulations for thermochromic systems are engineered with all the considerations previously mentioned. The examples below describe a thermochromic system with excellent color density, low residual color, narrow temperature ranges between full color and clearing point, and a narrow hysteresis window. The full color point and the clearing point are determined by visual inspection of the thermochromic system at a range of temperatures. The difference in temperature between the maxima of color change during the cooling cycle and the heating cycle is used to calculate hysteresis.

Adjusting the Acid Content

Water-based coatings are pH adjusted prior to addition of thermochromic pigment. As mentioned above, the pH should be neutral unless observation indicates that a different pH is required. To achieve the correct pH, one uses a good proton donor or acceptor, depending on whether the pH is to be adjusted up or down. To lower the pH, sulfuric acid is used, to raise it, the best proton acceptor so far is KOH. These two chemicals are very effective and do not seem to impart undesirable characteristics to the medium. The most effective pH is about 7.0, however, some tolerance has been noted between 6.0 and 8.0. A pH below 6.0 and above 8.0 has almost always immediately destroyed the pigment.

The acid value is defined as the number of milligrams of a 0.1 N KOH solution required to neutralize the alkali reactive groups in 1 gram of material under the conditions of ASTM Test Method D-1639-70. It is not yet fully understood how non-aqueous substances containing acid affect the thermochromic, but high acid number substances have inactivated the thermochromic pigments. Generally, the lower the acid number the better. To date coating formulations with an acid value below 20 and not including the harmful solvents described above have worked well. Some higher acid value formulations may be possible but generally it is best to use vehicle ingredients with low acid numbers or to adjust the acid value by adding an alkali substance. The greatest benefit of a neutral or low acid value vehicle will be increased shelf life. Buffers have been used historically in offset coating formulations to minimize the effects of the fountain solution on pigment particles. This is one possible solution to the potential acidity problem of the varnishes. One ingredient often used as a buffer is cream of tartar. A dispersion of cream of tartar and linseed oil can be incorporated into the coating. The net effect is that the pigments in the coating are protected from the acidic fountain solution.

Coating Formulations

The encapsulated thermochromic systems of the present disclosure may be referred to as pigments. In order to add normal pigment to coating, dye, or lacquer, the pigment itself is ground into the base. This disperses the pigment throughout the base. The addition of more pigment intensifies the color. Since the pigment often has a very intense color, it is sometimes acceptable for only about 10% of the final coating to be made up of normal pigments.

A base for a coating formulation using encapsulated thermochromic systems of the present disclosure may be developed using off the shelf ingredients. The coating will incorporate, where possible, and be compatible with different coating types and solvents with molecular weights larger than 100 while avoiding aldehydes, diols, ketones, and, in general, aromatic compounds. Important considerations with respect to the ingredients within the coating vehicle are the reactivity of the ingredients with the encapsulated thermochromic system.

Unwanted interactions between media and the encapsulated thermochromic systems can occur between compounds found in coating formulations. The long alkyl chains of many of the compounds found in coating vehicles may have reactive portions that can fit through the pores of the capsule and interact with the inner phase and denature it through this interaction. Since the behavior of the thermochromic system is related to the shape and the location of its molecules at given temperatures, disrupting these structures could have a large impact on the characteristics of the thermochromic system. Even molecules that cannot fit through the capsule pores may have reactive portions that could protrude into the capsule and thereby influence the color transition of the thermochromic system within the capsule. Therefore, mineral spirits, ketones, diols, and aldehydes are preferably minimized in any medium in which the encapsulated are also preferably avoided. If these compounds are substantially reduced or eliminated the thermochromic systems will perform better and have a longer shelf life.

Another important step in using the encapsulated thermochromic systems of the present disclosure in coating formulations is to adjust the pH or lower the acid value of the coating base before the thermochromic system is added. This can be done by ensuring that each individual component of the base is at the correct pH or acid value or by simply adding a proton donor or proton acceptor to the base itself prior to adding the thermochromic system. The appropriate specific pH is generally neutral, or 7.0. The pH will vary between 6.0 and 8.0 depending on the coating type and the color and batch of the thermochromic system.

Once a slurry and the base have been properly prepared, they are combined. The method of stirring should be low speed with non-metal stir blades. Other additives may be incorporated to keep the thermochromic system suspended. The coating should be stored at room temperature.

Most thermochromic pigments undergo a color change from a specific color to colorless. Therefore, layers of background colors can be provided under thermochromic layers that will only be seen when the thermochromic pigment changes to colorless. If an undercoat of yellow is applied to the substrate and then a layer containing blue thermochromic pigment is applied the color will appear to change from green to yellow, when what is really happening is that the blue is changing to colorless.

The substrates that the thermochromic coatings are printed upon are preferably neutral in pH, and should not impart any chemicals to the capsule that will have a deleterious effect on it.

Thermochromic coatings contain, in combination, a vehicle and a pigment including thermochromic microcapsules. The thermochromic microcapsules are preferably present in an amount ranging from 1% to 50% of the coating by weight on a sliding scale relative to other pigments. The vehicle contains a solvent that is preferably present in an amount ranging from 25% to 75% by weight of the coating.

The aqueous pigment slurries have particle sizes less than 5 microns and when drawn-down on coating test paper and dried, the pigment coating shows reversible thermochromic properties when cooled to the solidification point of the fatty ester, alcohol, amide, or a blend designed to obtain a specific temperature for full color formation. Such pigments can be designed to have a range of temperature for transition from full absorption temperature (full absorption color or UVA absorption point) to no color or no UVA absorption temperature (clearing point) of 2-7° C. The pigments are very useful for manufacture of coating, and injected molded plastic products by spray drying prior to formulation into coating compositions or extrusion into thermoplastic polymers to produce pellet concentrates for manufacture of injection molded thermochromic plastic products such as cups, cup lids, jars, straws, stirrers, container sleeves, shrink wrap labels. For example, thermochromic compositions were identified that permit generation of high quality saturated photographic quality yellow color that is very useful to formulate new orange, red, and green colors by mixing with magenta and/or cyan thermochromic pigments or by initial co-encapsulation of the yellow leuco dye with magenta and/or cyan leuco dyes and appropriate color developers during the pigment manufacture. Alternatively leuco pigments were identified that can change from absorption mainly in the region from 280 to 350 nm to absorption mainly from 350 to 400 nm.

Example 1

Pigment Formulations

The internal phase chemistry for the microcapsules has been tested with the following solvents that to engineer the temperature profile and thermal memory:

| Methyl Palmitate | FC 12-13 | CP 23-27 |
| Tetradecanol | FC 17-19 | CP 29-33 |
| Lauryl Laurate | FC 15-17 | CP 25-29 |

These internal phase esters or alcohols have been tested with standard fluoran and phthalide dyes using BHPMP as a chemical developer. The exact temperature profile and thermal memory is specific to the dye, or mixture of dyes. The dyes and developer may be co-encapsulated or separately encapsulated to achieve a specific color with the desired temperature profile and thermal memory. The ratio of the dye: developer may be for example 1:1 to 1:4 in order to achieve desirable color density with minimal residual.

The following dyes may be microencapsulated with Developer CAS#6807-17-6 (BHPMP) for various color formulations as described above.

| Aqua dye | CAS# 132467-74-4 |
| Blue-63 dye | CAS# 69898-40-4 |
| Black XV | CAS# 36431-22-8 |
| Red-40 dye | CAS# 50292-91-6 |
| Green dye | CAS# 34372-72-0 |
| Orange dye | CAS# 21934-68-9 |

The internal phase as described above may be microencapsulated using conventional urea-formaldehyde processes to form thermochromic pigments.

Example 2

Coating Formulations

Any of the thermochromic pigments prepared according to Example 1 above may be mixed with synthetic resins to form liquid coatings for use as precursors in forming the layers 210-218. Various examples of this chemistry are as follows:

In one embodiment, a thermochromic coating formulation includes:

| Ingredient | Weight Percent of Coating |
|---|---|
| Pigment* | 1% to 40% |
| Vehicle | |
| Polymerizable resin | 5% to 30% |
| Dispersing agent | 0% to 5% |
| Solvent | 0% to 50% |
| Curing agent | 0% to 25% |
| Wax | 0% to 5% |

*Assessed by solids content upon complete drying of pigment capsules, but does not need to be dried and may be mixed as a slurry.

In one aspect, a reversible thermochromic coating for use in can and coil coatings contains a reversible thermochromic pigment in an amount from 1% to 50% by weight of the coating, and a vehicle forming the balance of the coating. The vehicle includes a resin selected from the group consisting of epoxy, polyester, urethane, acrylic acid and acrylate resins, and combinations thereof. Commercially available thermochromic pigments may be readily obtained in a variety of colors demonstrating color transition temperatures from about 5° C. and up to about 65° C. A range of color formulations may be made by mixing the pigment to include one or more of the following reversible thermochromic colors: yellow, magenta, cyan, and black. These may be further mixed to include other dyes or solid pigments that are non-thermochromic in nature. The pigment may change from a colorless state to a colored state upon cooling to the reactive temperature, or to a colored state upon heating to the reactive temperature. It is preferred that the microcapsules are formed of urea-formaldehyde or melamine-formaldehyde that is acid catalyzed to enhance the inherent stability in polar, low molecular weight solvents having a molecular weight of about less than 100 g/mol.

When premised using a nonpolar solvent, the coatings can demonstrate shelf stability exceeding 14 or 45 days when stored at about 20° C. Some coating formulations demonstrate shelf stability in excess of one year.

The curing agent is generally compatible with the resin for this purpose and may be, for example, a latent blocked amine to initiate a polymerization reaction upon heating.

The coating is preferably roller-coated onto coil stock aluminum or steel and the roll stock aluminum is subsequently formed into one or more beverage can components. These components may be selected from the group consisting of beverage can ends, beverage can tabs, bottle caps, and/or beverage container closures. The aluminum is preferably an alloy that is commonly used in canning operations, such as aluminum alloy 5182-H48. The coating process preferably occurs in one or more coats to yield a dried film with a thickness ranging from 1 mg/in$^2$ up to 5.5 mg/in$^2$.

Example 3

Two Part Coating

Part A (30% by weight of coating)
Thermochromic pigment (any color)*
Part B (70% by weight of coating)
Clear Coating (an epoxy coating available from Watson Standard of Pittsburgh, Pa.)
* This material may be purchased on commercial order from Chromatic Technologies, Inc. of Colorado Springs Colo., and may include for example S5BOXX3105W, a blue thermochromic slurry that goes from a colored to colorless state when the temperature exceeds 31° C.

Example 4

Two Part Coating

Part A (60% by weight of coating)
45% Thermochromic Pigment (any color)*
50% Epoxy resin (for example Epon 863 available from Lawter of LaVergne, Tenn.)
3.3% Dispersing aid (for example Disperbyk 2025 available from Byk of Wallingford, Conn.)
1.7% Curing agent (for example Ancamine 2458 available from Air Products of Allentown, Pa.)
Part B (40% by weight of coating)
85% Clear Coating (an epoxy coating available from Watson Standard of Pittsburgh, Pa.)
15% Solvent to reduce viscosity (for example, butyl carbitol acetate available from Lawter of LaVergne, Tenn.)
* This material may be purchased on commercial order from Chromatic Technologies, Inc. of Colorado Springs Colo., and may include for example S5BOXX3105W, a blue thermochromic slurry that goes from a colored to colorless state when the temperature exceeds 31° C.

Example 5

One Part Coating

20% (w/w) Thermochromic Pigment (any color)* 13% Polyester resin (for example, Decotherm 290 available from Lawter of LaVergne, Tenn.)
0.5% (w/w) Dispersing aid (for example, Byk 370 available from Byk of Wallingford, Conn.)
7% (w/w) Curing agent 1 (for example, Cymel 328 available from Cytec Industries of Woodland Park, N.J.)
1.5% (w/w) Curing agent 2 (for example, imidazole available from Aldrich of St. Louis, Mo.)
2% (w/w) Wax (for example, Fluoron 735 available from Lawter of LaVergne, Tenn.)
30% (w/w) Solvent (for example, ethyl-3-ethoxypropionate available from Univar of Redmond, Wash.)
26% (w/w) Clear Coating (an epoxy coating available from Watson Standard of Pittsburgh, Pa.)

Example 6

One Part Coating

15% (w/w) Thermochromic Pigment (any color)*
10% (w/w) Resin (for example, Epon 896 available from Lawter of LaVergne, Tenn.)
1.5% (w/w) Dispersing aid (for example, Disperbyk 112 available from Byk of Wallingford, Conn.)
0.5% (w/w) Curing agent 1 (for example, Nacure 2500 available from King Industries of Norwalk, Conn.)
4% (w/w) Curing agent 2 (for example, Cymel 325 available from Cytec Industries of Woodland Park, N.J.)
1.5% (w/w) Wax—0.5 wt % (for example, Ultrapoly 211A available from Lawter of LaVergne, Tenn.)
5% (w/w) Solvent 1 (for example, Heloxy Modifier 62 available from Lawter of LaVergne, Tenn.)
21.5% (w/w) solvent 2 (for example, ethyl-3-ethoxypropionate available from Univar of Redmond, Wash.)
41% (w/w) Clear Coating (an epoxy coating available from Watson Standard of Pittsburgh, Pa.)

Figure 7:
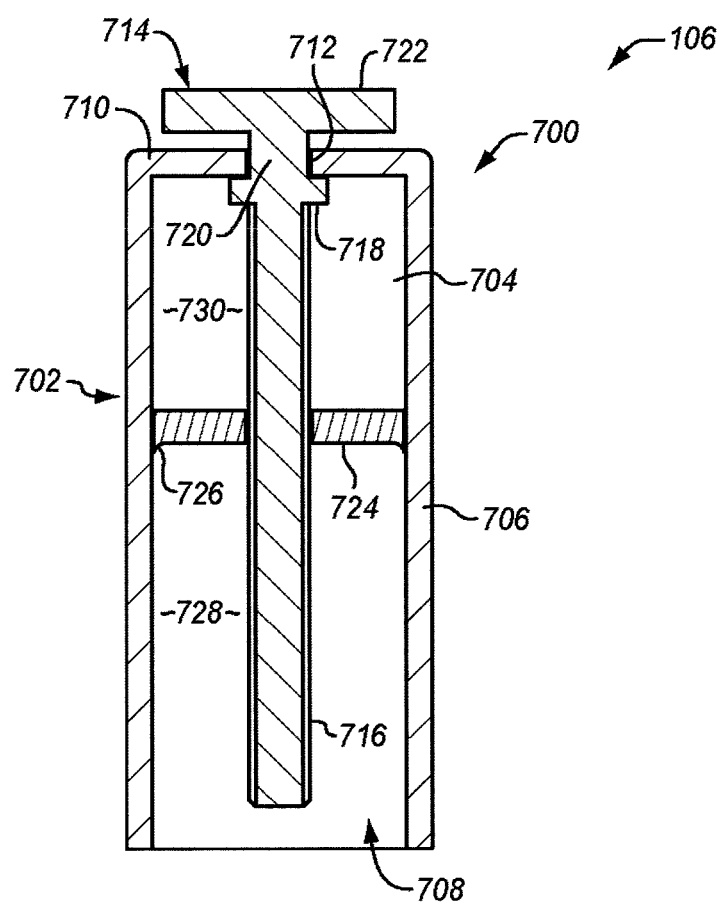
FIG. 7 is a midsectional view of a writing instrument that may be used for purposes of color activation of the thermochromic pigments.

FIG. 7 is a midsectional view of object 106 in an embodiment constructed as a cooled writing instrument 700 A housing 702 defines an interior chamber 704 and includes a cylindrical sidewall 706 that presents an open end 708 and is integrally molded with a cap 710. The cap 710 presents a central aperture 712 that receives an axially elongate plunger assembly 714. The plunger assembly 714 includes an externally threaded shaft 716 rising to a shoulder 718 located just inside the cap 710. A non-threaded neck 720 is received within the aperture 712, which retains the plunger assembly 714 by interior abutment against shoulder 718 and exterior abutment against turn-handle 722. A diaphragm 724 has a substantially planar structure extending transversely with respect to the axis of shaft 718. The diaphragm 724 threadably engages the shaft 718 such that clockwise rotation of turn-handle 722 advances the diaphragm 724 towards the open end 708. Counter clockwise rotation retracts the diaphragm 724 further into the interior chamber 704. A wiper meniscus 726 is provided to prevent water from leaking across the diaphragm 724 from a first [portion 728 of the interior chamber 704 proximate the open end 708 to a second portion 730 proximate cap 710.

In use, the portion 728 is filled with water. The water is frozen to form ice in portion 728, and the plunger assembly is rotated clockwise to advance the ice out of the open end 708. The ice is used to contact surface 102 of pad 100 for the drawing of indicia by color activation of thermochromic pigment as discussed above with respect to FIGS. 4-6. It will be appreciated that the sidewall 706 is not required to be cylindrical as shown in FIG. 7, and may comprise other shapes, such as a triangle a star, a square, or a rhombus. These shapes may be used to stamp patterns on surface 102.

Figure 8:
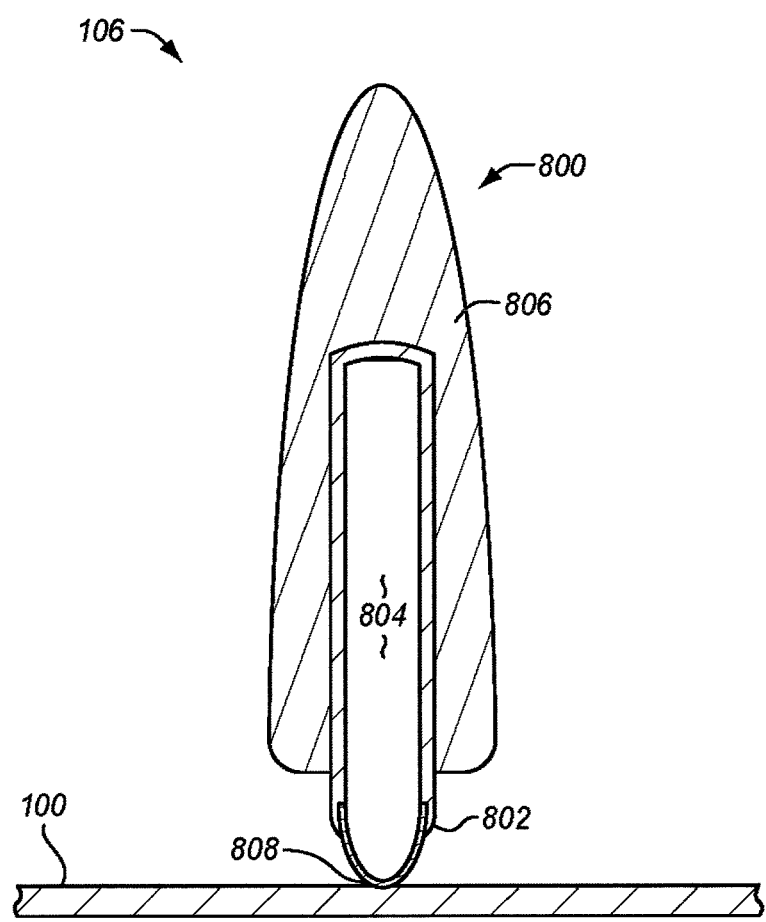
FIG. 8 is a midsectional view of a writing instrument that may be used for purposes of color activation of the thermochromic pigments.

FIG. 8 is a midsectional view of object 106 in an embodiment constructed as a cooled writing instrument 800. A sealed tube 802 contains a coolant material, such as a mixture of propylene glycol and water within reservoir 804. This may be frozen at a temperature of −10° C. to −20° C. Foam insulation 806 prolongs the useful life of the coolant material as it thaws between freeze cycles. A rounded tip 808 may flexibly deform as the tip 808 contacts the writing pad 100.

The foregoing disclosure teaches by way of example, and not by limitation. Those skilled in the art will appreciate that insubstantial changes may be made with respect to what is disclosed without departing from the scope and spirit of the invention. Accordingly, the inventors hereby state their intention to rely upon the Doctrine of Equivalents to protect their full rights in what is claimed.

We claim:

1. A thermochromic coloring pad, comprising:
  a sheet made of synthetic resin supporting a thermochromic material,
  the thermochromic material having a color activation temperature above 0° C. and a color deactivation temperature of less than human body temperature, whereby the thermochromic material is selectively activatable such that
    the sheet may be cooled to full color activation whereupon a subtraction image may be drawn on the sheet by contacting the sheet with human fingers, and
    the sheet may be heated to a point above the color deactivation temperature whereupon a positive image may be drawn on the sheet by contacting the sheet with a writing instrument that is chilled to a temperature less than the color activation temperature.

2. The coloring pad of claim 1, wherein the color activation temperature ranges from 12° C. to 19° C. and the color deactivation temperature ranges from 23° C. to 35° C.

3. The coloring pad of claim 1, wherein the pad comprises a plurality of the sheets in laminated form, each sheet having a different thermochromic material.

4. The coloring pad of claim 1, wherein the thermochromic material resides in a layer coating a surface of the sheet.

5. The coloring pad of claim 1, further comprising predetermined indicia on the pad providing background for an educational game or exercise such that selective activation of the thermochromic material provides an inter active dimension to the educational game or exercise.

6. The coloring pad of claim 5, wherein the predetermined indicia includes a connect-the-dot pattern.

7. The coloring pad of claim 5, wherein the predetermined indicia includes lining to practice the alphabet.

8. The coloring pad of claim 5, wherein the predetermined indicia includes an outline for coloring a drawing.

9. The coloring pad of claim 1, wherein the sheet supports a plurality of thermochromic materials providing an array of elements,
  each of the elements being allocated to a particular color corresponding to one of the plurality of thermochromic materials,
  each of the thermochromic materials having different colors and different thermal activation/deactivation performance, such that a mixture of colors may be achieved by activating or deactivating elements of the array.

10. The coloring pad of claim 1, wherein the thermochromic material includes a mixture of thermochromic pigments.

11. A method of coloring by use of the coloring pad according to claim 1, comprising:
  exposing the pad to a temperature that renders the thermochromic material to one of a color activated state or a color deactivated state; and
  when the thermochromic material is in the color activated state, drawing an image on the pad by use of human fingers;
  when the thermochromic material is in the color deactivated state, drawing an image on the pad by the use of a cooled writing instrument.

\* \* \* \* \*